H. L. FERGUSON.
MEANS FOR PURIFYING WATER.
APPLICATION FILED FEB. 24, 1914.
1,128,121.
Patented Feb. 9, 1915.
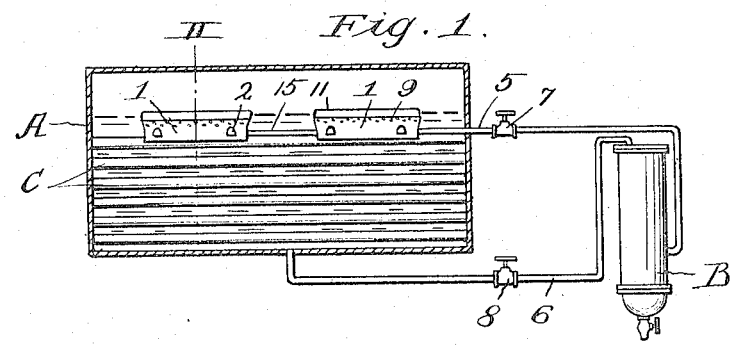
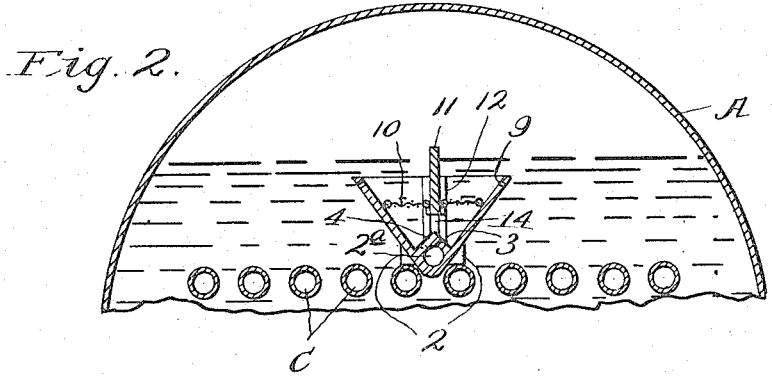
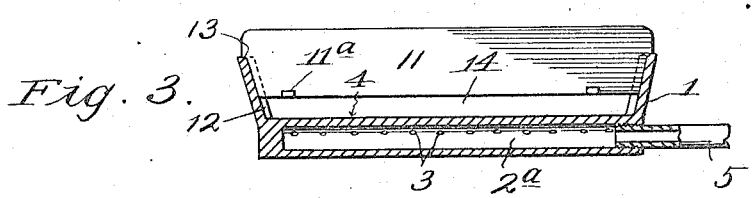
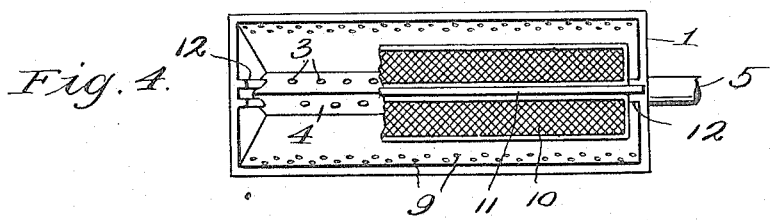
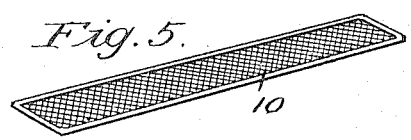
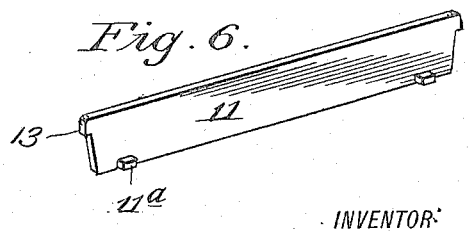
WITNESSES:
R. E. Hamilton
L. J. Fischer
INVENTOR:
Harley L. Ferguson,
BY F. G. Fischer,
ATTORNEY.

UNITED STATES PATENT OFFICE.

HARLEY L. FERGUSON, OF KANSAS CITY, MISSOURI.

MEANS FOR PURIFYING WATER.

1,128,121.   Specification of Letters Patent.   Patented Feb. 9, 1915.

Application filed February 24, 1914. Serial No. 820,638.

*To all whom it may concern:*

Be it known that I, HARLEY L. FERGUSON, a citizen of the United States, residing at Kansas City, in the county of Jackson and State of Missouri, have invented certain new and useful Improvements in Means for Purifying Water, of which the following is a specification.

My invention relates to means for collecting sediment and other impurities in boilers, and my object is to provide a simple, inexpensive apparatus of this character whereby sediment, scale, and other impurities in boiler water may be collected and separated therefrom.

In the accompanying drawing which illustrates the invention: Figure 1 is a longitudinal section of a boiler provided with my apparatus. Fig. 2 is a broken cross section, enlarged, on line II of Fig. 1. Fig. 3 is a longitudinal section of a skimmer constituting an important feature of the invention. Fig. 4 is a plan view of said skimmer with a portion of its strainer and baffle-plate broken away. Fig. 5 is a detail perspective of one section of the strainer. Fig. 6 is a detail perspective of the baffle-plate.

A designates a boiler, and B a mud-drum of any ordinary or preferred type.

1 designates a trough-shaped skimmer constituting an important feature of the invention. Said skimmer is provided at its opposite sides with feet 2 adapted to rest upon two of the uppermost boiler flues C, as shown on Fig. 2. The bottom of the skimmer 1 has a longitudinal duct $2^a$, communicating with the interior of said skimmer through perforations 3, extending through the ridge-shaped bottom 4. The holes on one side of the ridge-shaped bottom 4 are alternately arranged with relation to those on the opposite side. Hence, impurities entering the duct $2^a$ from one side will not have a tendency to flow transversely through said duct and pass out through the opposite perforations, but on the contrary will leave said duct through an outlet pipe 5, communicating with the mud-drum B in which the impurities from the water are collected and left, and the purified water permitted to return to the boiler through a return pipe 6. Pipes 5 and 6 are provided with valves 7 and 8, respectively, so that communication between the skimmer 1 and the mud-drum B may be established or shut off at will.

The upper side portions of the skimmer 1 have perforations 9 to exclude large particles of scale or other foreign matter too coarse to pass through the strainer 10, which is made in two sections to fit against the opposite sides of the skimmer 1 and a centrally-disposed baffle-plate 11, said baffle-plate being provided at its lower margin with oppositely-projecting lugs $11^a$ to support the adjacent sides of the strainer sections. The baffle-plate 11 extends longitudinally of the skimmer 1, which latter has a pair of parallel lugs 12 at each end spaced apart to receive said baffle-plate. The baffle-plate 11 is provided at its ends with shoulders 13 which rest upon the upper end margins of the skimmer 1 and thus limit the entrance of the baffle-plate therein. The baffle-plate 11 is of such proportions that when placed in the skimmer 1, a space 14 is left between its lower margin and the ridge-shaped bottom 4, while the upper margin of said baffle-plate projects above the sides of the skimmer 1, as clearly shown on Fig. 3.

The skimmer 1 and the baffle-plate 11 are of such proportions that when said skimmer rests upon the flues C it will be submerged in the water, while the baffle-plate projects above the surface of the water (see Fig. 2), to intercept impurities as will hereinafter appear.

In practice, one skimmer, or a series thereof, may be placed in the boiler. When a plurality of skimmers is employed they are connected by pipes 15, so that water entering any of the ducts $2^a$ may flow freely to the outlet pipe 5. As the circulation of the water is usually upward adjacent the sides of the boiler shell and downward through the vertical axis of the boiler, impurities carried against the opposite sides of the baffle-plate 11 are deflected downward thereby and enter the ducts $2^a$ through the perforations 3. Any impurities too large to enter the perforations 3 are collected by the strainer sections 10, hence the perforations 3 are not likely to become clogged. Any sediment, however, which may collect on the bottom-ridge 4 and in the perforations 3 can be readily blown out in the usual manner. The strainer sections 10 can be readily removed and cleaned whenever necessary.

The apparatus may be used to advantage in connection with both stationary boilers and portable boilers, and it can also be used to advantage in collecting impurities in the process of refining oils.

Having thus described my invention, what I claim and desire to secure by Letters Patent, is:

1. In an apparatus of the character described, a skimmer, a baffle-plate extending longitudinally of said skimmer, said baffle-plate having its upper margin projecting above the skimmer and its lower margin spaced from the bottom of said skimmer.

2. In an apparatus of the character described, a skimmer, a baffle-plate extending longitudinally of said skimmer, and a strainer supported by said baffle-plate and the skimmer.

3. In an apparatus of the character described, a trough-shaped skimmer having a ridge-shaped bottom with a duct extending longitudinally therethrough and perforations communicating with said duct and the interior of the skimmer, the longitudinal sides of said skimmer having perforations extending therethrough near their upper margins, substantially as described.

4. In an apparatus of the character described, a trough-shaped skimmer having a pair of parallel lugs at each end, and a baffle-plate extending longitudinally of said skimmer and removably held in place therein by said removable lugs, substantially as described.

5. In an apparatus of the character described, a skimmer, a baffle-plate extending longitudinally of said skimmer and removable therefrom, said baffle-plate having shoulders at its ends to rest upon the upper margin of the skimmer, and means on said skimmer to prevent lateral displacement of the baffle-plate.

6. In an apparatus of the character described, a skimmer, a baffle-plate extending centrally and longitudinally of the skimmer, said baffle plate having lugs at its opposite sides, and a strainer arranged in two sections at opposite sides of the baffle-plate, said sections resting upon the lugs and the adjacent sides of the skimmer.

In testimony whereof I affix my signature, in the presence of two witnesses.

HARLEY L. FERGUSON.

Witnesses:
F. G. FISCHER,
FRED C. FISCHER.